(12) United States Patent
Coatney et al.

(10) Patent No.: US 8,225,159 B1
(45) Date of Patent: Jul. 17, 2012

(54) METHOD AND SYSTEM FOR IMPLEMENTING POWER SAVINGS FEATURES ON STORAGE DEVICES WITHIN A STORAGE SUBSYSTEM

(75) Inventors: Doug Coatney, Sunnyvale, CA (US); John Bevilacqua, Sunnyvale, CA (US)

(73) Assignee: Netapp, Inc., Sunnyvale, CA (US)

( * ) Notice: Subject to any disclaimer, the term of this patent is extended or adjusted under 35 U.S.C. 154(b) by 1118 days.

(21) Appl. No.: 12/109,470

(22) Filed: Apr. 25, 2008

(51) Int. Cl.
*G06F 11/00* (2006.01)

(52) U.S. Cl. ............ 714/746; 714/43; 714/48; 714/704; 709/213; 360/73.03

(58) Field of Classification Search .................... 714/43, 714/48, 704; 709/213; 360/73.03
See application file for complete search history.

(56) References Cited

U.S. PATENT DOCUMENTS

| 5,452,277 | A | * | 9/1995 | Bajorek et al. | 369/53.18 |
|---|---|---|---|---|---|
| 5,774,292 | A | * | 6/1998 | Georgiou et al. | 360/73.03 |
| 5,898,880 | A | * | 4/1999 | Ryu | 713/323 |
| 5,907,859 | A | * | 5/1999 | Shimada et al. | 711/112 |
| 5,983,357 | A | * | 11/1999 | Sun | 713/324 |
| 7,373,559 | B2 | | 5/2008 | Guha | |
| 7,464,291 | B2 | * | 12/2008 | Nagata et al. | 714/6.13 |
| 2005/0278581 | A1 | * | 12/2005 | Jiang et al. | 714/40 |
| 2006/0282709 | A1 | * | 12/2006 | Shu et al. | 714/100 |
| 2007/0047536 | A1 | * | 3/2007 | Scherer et al. | 370/360 |

* cited by examiner

*Primary Examiner* — Robert Beausoliel, Jr.
*Assistant Examiner* — Jeison C Arcos
(74) *Attorney, Agent, or Firm* — Suiter Swantz pc llo (57) ABSTRACT

The present disclosure is directed to implementing power savings features on storage drives within a storage subsystem. A controller determines a drive is inactive and directs a power connector to prevent power from being provided to the drive. The controller may receive an input/output request for the inactive drive, direct the power connector to allow power to be provided, and provide the input/output request. When the controller receives an input/output request for the inactive drive, the controller sends a notification to the request's originator that the drive is unavailable and to retry after a fixed period of time. The controller performs maintenance on the drive when the drive is not inactive. The controller determines a maintenance time when the drive will be inactive and performs maintenance at an accelerated rate.

20 Claims, 9 Drawing Sheets

METHOD AND SYSTEM FOR IMPLEMENTING POWER SAVINGS FEATURES ON STORAGE DEVICES WITHIN A STORAGE SUBSYSTEM

FIELD OF THE INVENTION

The present disclosure relates generally to storage systems and more particularly to energy savings in storage systems.

BACKGROUND OF THE INVENTION

A data center is a facility utilized to house computer systems and associated components, such as telecommunications and storage subsystems (the portion of a computer system that provides storage). Data centers typically include power supplies, data communication connections, environmental controls, security, and redundant components. Data centers serve a variety of purposes including running applications and storing and archiving data.

Data centers require significant amounts of power and cooling. Owners and architects of data centers frequently look for ways to reduce TCO (total cost of ownership) for data centers.

SUMMARY OF THE INVENTION

The present disclosure is directed to a method and apparatus for implementing power savings features on storage devices within a storage subsystem.

A storage controller may receive input/output requests for a storage device. The storage controller may provide those input/output requests to the storage device. The storage controller may determine that the storage device is inactive when the storage controller has not received an input/output request for the storage device within a period of time. The storage controller may direct a storage device power connector to prevent power from being provided to the storage device when the storage controller determines that the storage drive is inactive, powering down the storage device. Alternatively, the storage controller may determine that the storage device is inactive when the storage controller has not received an input/output request for the storage device within a period of time and a head load count for the storage device is not within a threshold of a head load rating for the storage device. The storage controller may determine the head load count for the storage device by querying the storage device. The storage device may respond to the query by providing its head load count to the storage controller. The storage device may provide its head load count to the storage controller as part of a S.M.A.R.T. (Self-Monitoring, Analysis, and Reporting Technology) implementation. The storage controller may determine the head load rating for the storage device by looking up a head load rating for the storage device in a head load rating lookup table.

After the storage device has been powered down, the storage controller may receive an input/output request for the storage device. The storage controller may direct storage drive power connector to allow power to be provided to the storage drive, powering up the storage drive. After power is provided to the storage drive, the storage controller may provide the input/output request to the storage drive. When the storage controller receives an input/output request for the storage drive after the storage drive has been powered down, the storage controller may send a notification to the originator of the input/output request for the storage drive. The notification may notify the originator of the input/output request that the storage drive is currently unavailable. The notification may also notify the originator of the input/output request to try the input/output request after a fixed period of time.

The storage controller may perform maintenance on the storage drive when the storage drive is not inactive. Maintenance may include checking the media of the storage drive for media errors, correcting media errors in the media of the storage drive, checking the data stored on the storage drive for data errors (including, but not limited to, checking the data stored on the storage drive against parity information stored on other storage drives), and/or correcting data errors in the data stored on the storage drive. The storage controller may not perform maintenance on the storage drive when the storage drive is inactive. The storage controller may determine a maintenance time when the storage drive will be inactive. At the maintenance time, the storage controller may perform maintenance on the storage drive at the maintenance time.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the disclosure, examples of which are illustrated in the accompanying drawings.

In a storage subsystem, there are times where the storage devices are not being utilized for long periods of time. This is particularly true in a nearline storage configuration. A nearline storage configuration is an intermediate type of data storage which is an implementation between an online storage configuration and an offline storage configuration. An online storage configuration provides constant, rapid access to stored data. An offline storage configuration provides infrequent access to stored data for backup or archival purposes. A nearline storage configuration may not provide the immediate access to stored data provided by an online storage configuration, but provides quicker access to stored data than an offline storage configuration. In situations where storage devices are not being utilized for long periods of time, significant electricity could be saved by powering down the storage devices.

A small amount of storage devices include features enabling them to be commanded to power down. Storage devices which include these features power themselves down in response to receiving a command to power down. While this can aid attempts to avoid wasting energy in storage subsystems, not all storage devices include these sorts of features. A storage subsystem may include some storage devices which include this capability and some that do not have a capability to power themselves down. Frequently, a storage system may include many storage devices obtained before storage devices were available with power saving features. Further, the ability of a storage subsystem to utilize power saving features of storage devices is complicated by the proprietary nature of the way that different storage device vendors implement different power saving features. The lack of uniformity in power saving features available in storage devices makes it difficult for a storage subsystem to utilize power savings features of storage devices when such power saving features are available. The lack of uniformity in how power savings features are implemented in storage devices also makes it difficult for a storage subsystem to utilize power savings features of storage devices when such power saving features are available. Thus, even though a small amount of storage devices may include power saving features, many storage subsystems may not be able to utilize these power savings features. Many storage subsystems may not be able to utilize power saving features of storage devices because not all of the storage devices are capable of being commanded to power themselves down. Further, many storage subsystems may not be able to utilize power saving features of storage devices because there is no uniformity among the power saving features of storage devices (or how those features are utilized) that are capable of being commanded to power themselves down.

Figure 1:
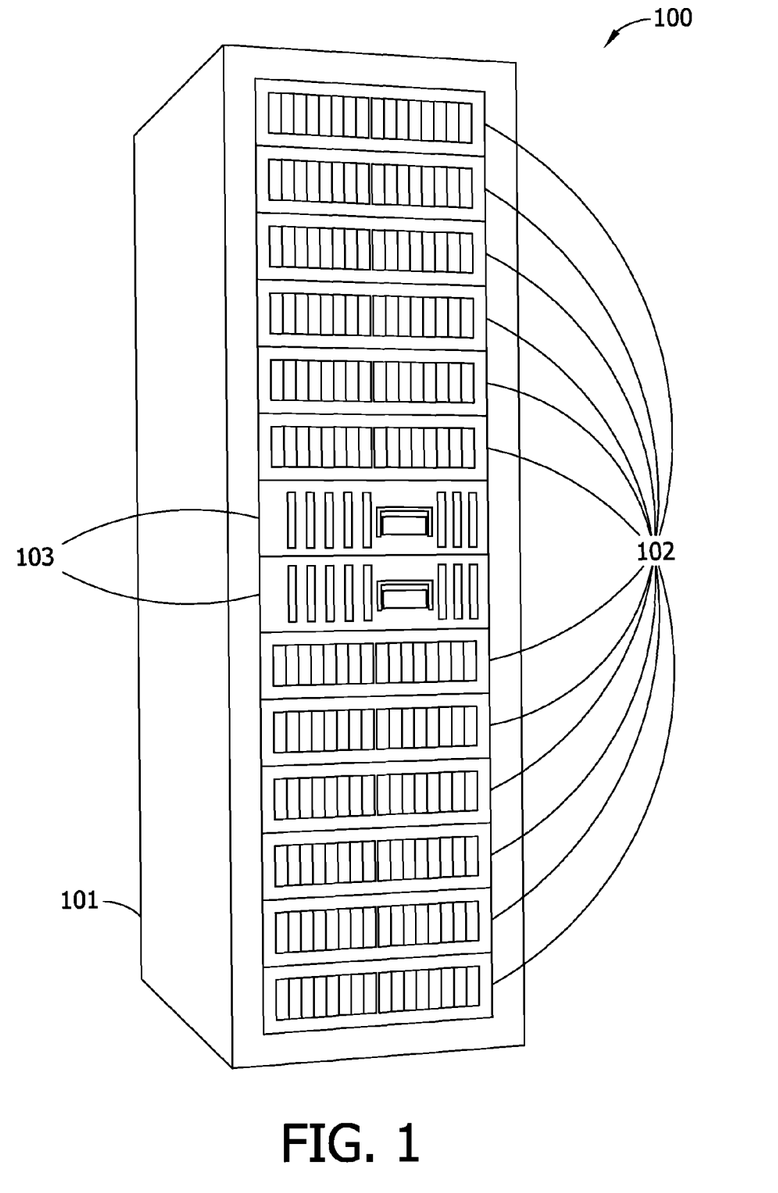
FIG. 1 is a diagram illustrating an isometric view of a storage subsystem, in accordance with an exemplary embodiment of the present disclosure.

Referring now to FIG. 1; a storage subsystem 100, in accordance with an exemplary embodiment of the present disclosure, is shown. The storage subsystem may comprise a variety of types of storage subsystems including, but not limited to, NAS (network attached storage) and SAN (storage area network). NAS is file-level computer data storage connected to a computer system providing data access to heterogeneous network clients. SAN is remote computer data storage connected to a computer system in such a way that the computer data storage devices appear as locally attached. The storage subsystem 100 includes an equipment rack 101, storage shelves 102, and storage subsystem controllers 103. Equipment rack 101 houses storage shelves 102 and storage subsystem controllers 103. Storage shelves 102 may include one or more storage devices. The one or more storage devices of storage shelves 102 may comprise one or more storage drives including, but not limited to, hard disk drives, solid state drives, IDE (integrated drive electronics) hard disk drives, IDE solid state drives, ATA (advanced technology attachment) hard disk drives, ATA solid state drives, PATA (parallel ATA) hard disk drives, PATA solid state drives, SATA (serial ATA) hard disk drives, SATA solid state drives, SCSI (small computer system interface) hard disk drives, SCSI solid state drives, SAS (serial attached SCSI) hard disk drives, SAS solid state drives, FC (fibre channel) hard disk drives, and FC solid state drives. The one or more storage devices of storage shelves 102, or the one or more storage shelves 102, may be configured as a RAID (redundant array of independent drives). Storage subsystem controllers 103 may comprise a computer appliance such as a filer sold by NetApp, Inc. It should be noted that although the storage subsystem 100 is illustrated as a single equipment rack 101 housing 12 storage shelves 102 and two storage subsystem controllers 103, storage subsystem 100 may include any number of equipment racks 101 (or no equipment rack 101 at all), any number of storage shelves (such as 1 or 15), and/or any number of storage subsystem controllers 103 (such as 1 or 20). Further, although the storage shelves 102 and the storage subsystem controllers 103 are illustrated as separate, a storage subsystem 100 may include one or more storage shelves 102 and one or more storage controllers 103 incorporated in a single device.

Figure 2:
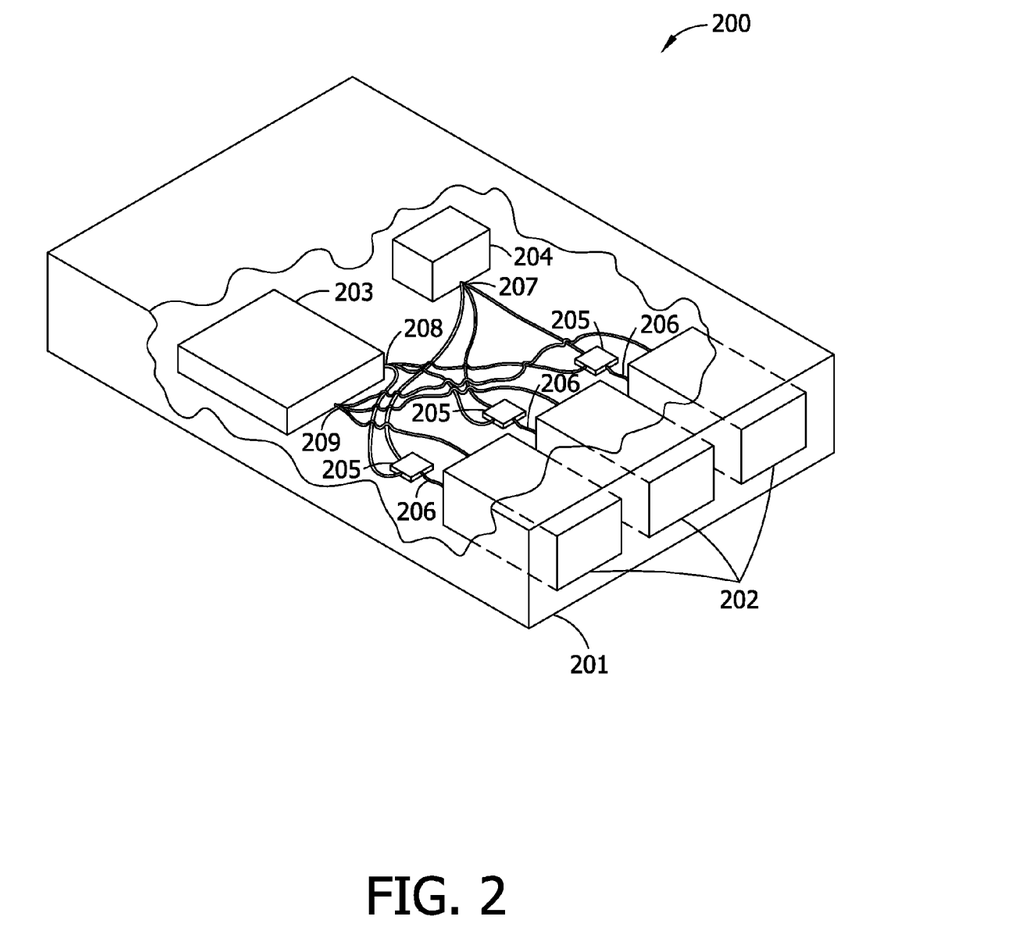
FIG. 2 is a diagram illustrating an isometric detailed view of a storage shelf, in accordance with an exemplary embodiment of the present disclosure.
Figure 3A:
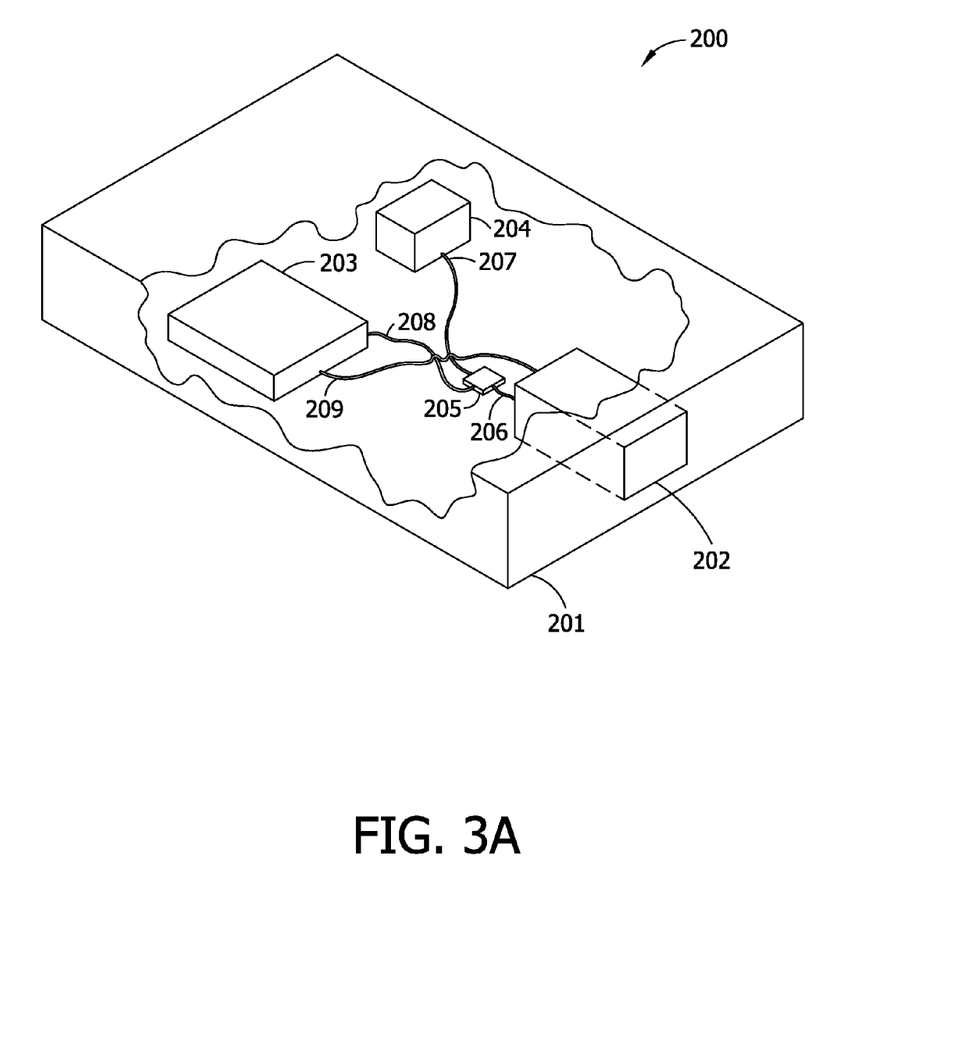
FIG. 3A is a diagram illustrating a simplified isometric detailed view of the storage shelf of FIG. 2, in accordance with an exemplary embodiment of the present disclosure.

Referring now to FIG. 2; a detailed view of a storage shelf 200, in accordance with an exemplary embodiment of the present disclosure, is shown. Storage shelf 200 may include a housing 201, one or more storage drives 202, a storage shelf controller 203, a power supply 204, storage drive power connectors 205, communication cables 209, power cables 206 and 207, and power control cables 208. Communication cables 209 may allow storage shelf controller 203 to communicate with storage drives 202. Power cables 206 and 207 may allow power supply 204 to supply power to storage drives 202 via storage drive power connectors 205. Power cables 206 and 207 may allow power supply 204 to supply both 5 volt and 12 volt power to storage drives 202 via storage drive power connectors 205. Power control cables 208 may allow storage shelf controller 203 to control whether power is supplied to storage drives 202 via storage drive connectors 205. Power connectors 205 may include one or more FETs (field-effect transistors), and/or other switching devices, which allow or prevent power to pass from power cable 207 to power cable 206 via power connectors 205 in response directions from storage shelf controller 203 via power control cables 208. Referring now to FIG. 3A, a simplified view of the storage shelf 200 of FIG. 2, in accordance with an exemplary embodiment of the present disclosure, is shown. For ease of understanding the connections between the components, only one storage drive 202, storage drive power connector 205, communication cable 209, power cables 206 and 207, and power control cable 208 are shown.

Storage drive 202 may comprise any kind of storage drive including, but not limited to, a hard disk drive, a solid state drive, an IDE (integrated drive electronics) hard disk drive, an IDE solid state drive, an ATA (advanced technology attachment) hard disk drive, an ATA solid state drive, a PATA (parallel ATA) hard disk drive, a PATA solid state drive, a SATA (serial ATA) hard disk drive, a SATA solid state drive, a SCSI (small computer system interface) hard disk drive, a SCSI solid state drive, a SAS (serial attached SCSI) hard disk drive, a SAS solid state drive, a FC (fibre channel) hard disk drive, and a FC solid state drive.

Storage shelf controller 203 may receive input/output requests for storage drive 202 and may provide those input/output requests to storage drive 202. Storage shelf controller 203 may receive input/output requests for storage drive 202 from a storage subsystem controller such as storage subsystem controllers 103 of FIG. 1. Storage shelf controller 203 may determine that storage drive 202 is inactive. Storage shelf controller 203 may determine that storage drive 202 is inactive when storage shelf controller 203 does not receive an input/output request for storage drive 202 within a period of time. The period of time may be any period of time including, but not limited to, an hour, twenty minutes, or three hours. When storage shelf controller 203 determines storage drive 202 is inactive, storage shelf controller 203 may direct storage drive power connector 205 via power control cable 208 to prevent power from passing from power cable 207 to power cable 206. Thus, power is not being provided from power supply 204 to storage drive 202, powering down storage drive 202.

Alternatively, storage shelf controller 203 may determine a head load rating for storage drive 202. When power is cycled to storage drive 202, storage drive 202 may load the head of storage drive 202. The head load rating for storage drive 202 may be the number of times storage drive 202 is rated to be able to load the head of storage drive 202 before failing. The head load rating for storage drive 202 may be 50,000. Storage shelf controller 203 may determine the head load rating for storage drive 202 by looking up a head load rating for storage drive 202 in a head load rating lookup table. Different models of storage drives 202 provided by different vendors may have different head load ratings.

For example, one model of storage drive 202 provided by one vendor may have a head load rating of 45,000 whereas another model of storage drive 202 provided by the same vendor may have a head load rating of 55,000. By way of another example, a storage drive 202 provided by a first vendor may have a head load rating of 40,000 whereas a second storage drive 202 provided by a second vendor may have a head load rating of 60,000. The head load rating lookup table may based on storage drive 202, model, vendor, and/or other features of storage drive 202 and may include the head load ratings for one or more storage drives 202. The storage shelf controller 203 may query storage drive 202 for information including, but not limited to, model and/or vendor in order to looking up a head load rating for storage drive 202 in the head load rating lookup table. Alternatively, storage shelf controller 203 may determine the head load rating for storage drive 202 by querying storage drive 202 and/or by assuming a head load rating for storage drive 202 which does not exceed the head load rating of most storage drives 202 (such as 35,000). Storage shelf controller 203 may also determine a head load count for storage drive 202. The head load count for storage drive 202 may be the number of times storage drive 202 has actually loaded the head of storage drive 202. Storage shelf controller 203 may determine the head load count for storage drive 202 by querying storage drive 202 utilizing communication cable 209. Storage drive 202 may respond to the query by providing its head load count to storage shelf controller 203 via communication cable 209. Storage drive 202 may provide its head load count to storage shelf controller 203 as part of a S.M.A.R.T. implementation. S.M.A.R.T. is a monitoring system for storage drives to detect and report on various indicators of reliability in order to anticipate failures. Storage shelf controller 203 may determine that storage drive 202 is inactive when storage shelf controller 203 does not receive an input/output request for storage drive 202 within a period of time and the head load count for storage drive 202 is not within a threshold of the head load rating for storage drive 202. The threshold may be any threshold including, but not limited to 1000. For example, if the head load count for storage drive 202 is 49,100, the head load rating for storage drive 202 is 50,000, and the threshold is 1500 then the head load count would be within the threshold of head load rating. In such a case storage shelf controller 203 would not determine storage drive 202 is inactive even if an input/output request is not been received for storage drive 202 within the time period. When storage shelf controller 203 determines storage drive 202 is inactive, storage shelf controller 203 may direct storage drive power connector 205 via power control cable 208 to prevent power from passing from power cable 207 to power cable 206. Thus, power is not being provided from power supply 204 to storage drive 202, powering down storage drive 202.

After storage drive 202 has been powered down, storage shelf controller 203 may receive an input/output request for storage drive 202. If storage shelf controller 203 receives an input/output request for storage drive 202 after storage drive 202 has been powered down, storage shelf controller 203 may direct storage drive power connector 205 via power control cable 208 to allow power to pass from power cable 207 to power cable 206. Thus, power is being provided from power supply 204 to storage drive 202, powering up storage drive 202. After power is being provided from power supply 204 to storage drive 202, storage shelf controller 203 may provide the input/output request to storage drive 202. When storage shelf controller 203 receives an input/output request for storage drive 202 after storage drive 202 has been powered down, storage shelf 203 may send a notification to the originator of the input/output request for storage drive 202. The notification may notify the originator of the input/output request that storage drive 202 is currently unavailable. The notification may also notify the originator of the input/output request to try the input/output request after a fixed period of time. Thus, because storage shelf controller 203 may direct storage drive power connector 205 via power control cable 208 to allow power to pass from power cable 207 to power cable 206 in response to receiving the input/output request for storage drive 202, storage drive 202 may be powered up when the originator of the input/output request retries the input/output request.

Storage shelf controller 203 may perform maintenance on storage drive 202 when storage drive 202 is not inactive. Maintenance may include checking the media of storage drive 202 for media errors, correcting media errors in the media of storage drive 202, checking the data stored on storage drive 202 for data errors (including, but not limited to, checking the data stored on storage drive 202 against parity information stored on other storage drives), and correcting data errors in the data stored on storage drive 202. Storage shelf controller 203 may not perform maintenance on storage drive 202 when storage drive 202 is inactive. Storage shelf controller 203 may determine a maintenance time when storage drive 202 will be inactive. For example, storage drive 202 may always be inactive between 6 am and 6 pm. In this case, storage shelf controller 203 may determine that the maintenance time is 11 pm. At the maintenance time, storage shelf controller 203 may perform maintenance on storage drive 202 at the maintenance time at an accelerated rate. The maintenance performed on storage drive 202 by storage shelf controller 203 may include input/output requests for storage drive 202. Because of input/output requests for storage drive 202, resulting from the maintenance, storage shelf controller 203 may direct storage drive power connector 205 via power control cable 208 to allow power to pass from power cable 207 to power cable 206. Thus, power is being provided from power supply 204 to storage drive 202, powering up storage drive 202. For example, storage shelf controller 203 may perform maintenance on storage drive 202 when it is active such that maintenance requires 12 hours for completion in order that storage drive 202 is not prevented from handling input/output requests because of maintenance. At maintenance time, storage shelf controller may perform maintenance on storage drive 202 at the accelerated rate such that the maintenance which would have required 12 hours for completion only requires 6 hours for completion. Because storage drive 202 would be inactive at maintenance time, storage drive 202 would not need to handle non-maintenance input/output requests and maintenance can be performed at the accelerated rate without preventing the handling of non-maintenance input/output requests.

Figure 3B:
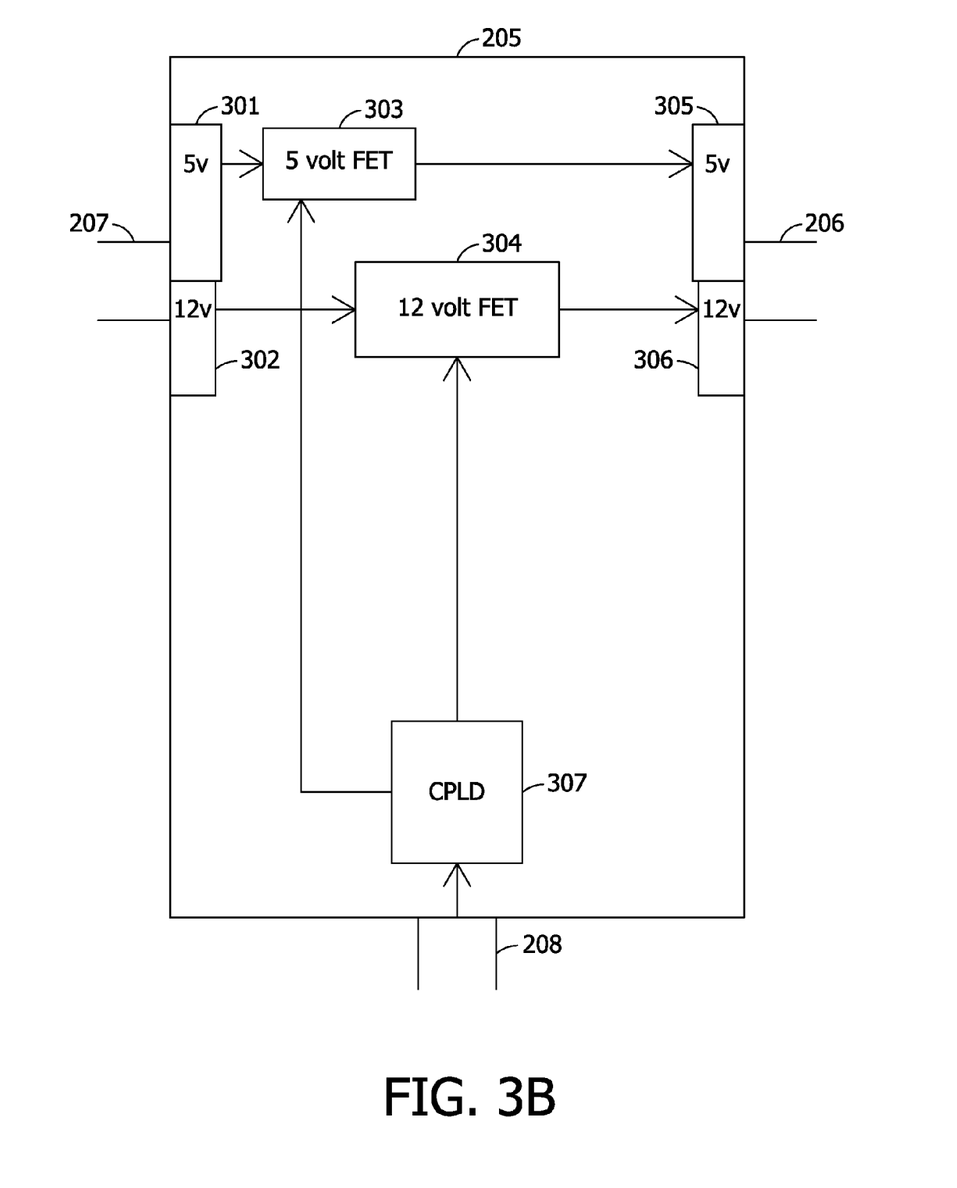
FIG. 3B is a circuit diagram illustrating a circuit utilized in the power connector of FIGS. 2 and 3, in accordance with an exemplary embodiment of the present disclosure.

FIG. 3 is a circuit diagram illustrating a circuit utilized in power connector 205, in accordance with an exemplary embodiment of the present disclosure. 5V power input connection 301 may receive a 5V power input via power cable 207. 5V power input connection 301 may provide the received 5V power input to 5 volt FET 303. 12V power input connection 302 may receive a 12V power input via power cable 207. 12V power input connection 302 may provide the received 12V power input to 12 volt FET 304. CPLD (complex programmable logic device) 307 may receive a control signal via power control cable 208. CPLD 307 may provide the received control signal to 5 volt FET 303 and 12 volt FET 304. 5 volt FET 303 may provide the 5V power input received from 5V power input connection 301 to 5V power output connection 305 when the control signal received from CPLD 307 indicates to provide power. 5 volt FET 303 may not provide the 5V power input received from 5V power input connection 301 to 5V power output connection 305 when the control signal received from CPLD 307 indicates to not provide power. 12 volt FET 304 may provide the 12V power input received from 12V power input connection 302 to 12V power output connection 306 when the control signal received from CPLD 307 indicates to provide power. 12 volt FET 304 may not provide the 12V power input received from 12V power input connection 302 to 12V power output connection 306 when the control signal received from CPLD 307 indicates to not provide power. 5V power output connection 305 may provide the 5V power input received from 5 volt FET 303 to power cable 206. 12V power output connection 306 may provide the 12V power input received from 12 volt FET 304 to power cable 206. Thus, storage drive power connector 205 may be directed by storage shelf controller 203 via power control cable 208 to prevent or allow power to pass from power cable 207 to power cable 206. Although power connector 205 has been described as utilizing the circuit illustrated in FIG. 3, it should be understood that other circuits may be utilized for power connector 205 without departing from the scope of the present disclosure.

Although storage shelf 200 has been described as including storage drive power connectors 205, it should be understood that storage shelf controller 203 may directly supply power from power supply 204 to storage drives 202 without departing from the scope of the present application. In such a case, storage shelf controller 203 may allow or prevent power to be provided to storage drives 202 directly rather than directing storage drive power connectors 205 to allow or prevent power to be provided to storage drives 202.

Although storage shelf 200 has been described as including storage shelf controller 203, it should be understood that storage shelf controller 203 may be alternatively be included in a storage subsystem controller rather than the storage shelf such as the storage subsystem controller 103 of FIG. 1.

Figure 4:
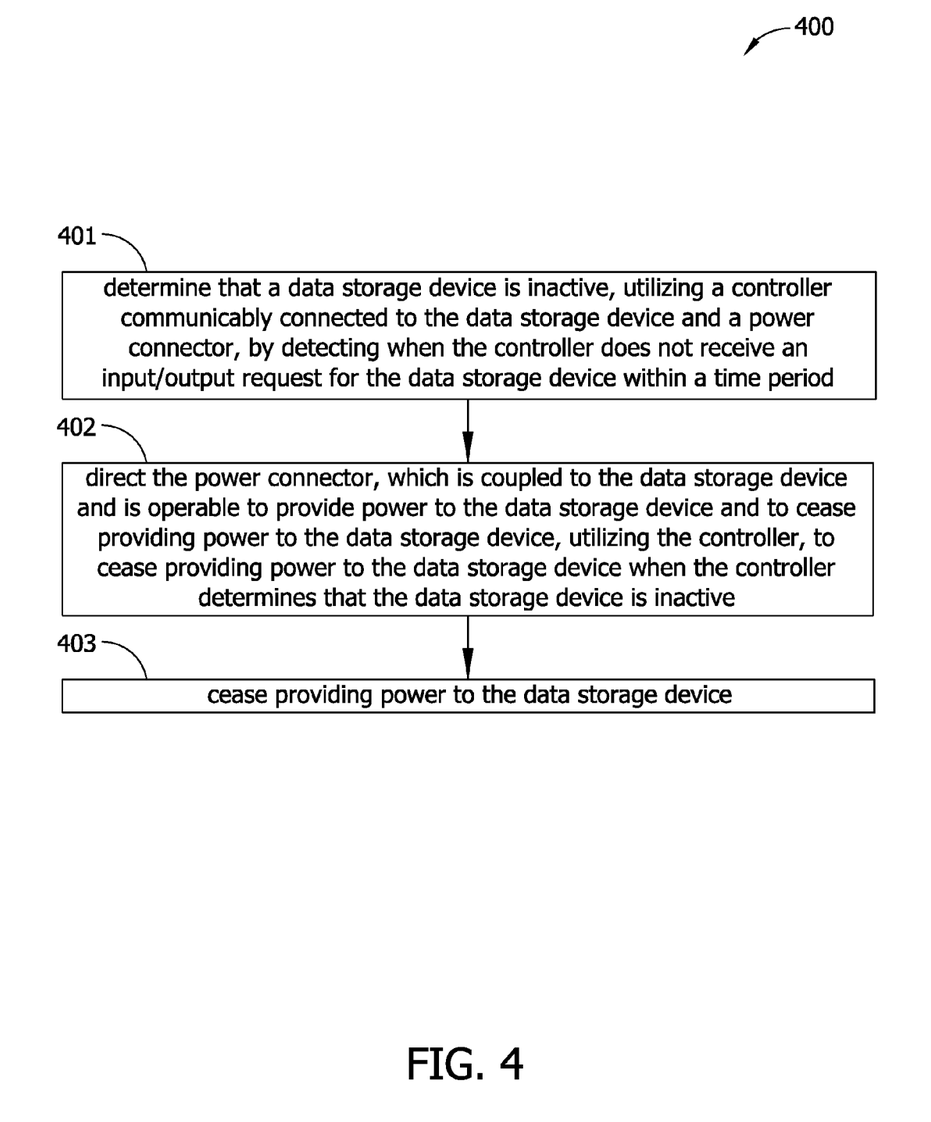
FIG. 4 is flow chart illustrating a method of controlling power for a storage system, in accordance with an exemplary embodiment of the present disclosure.

Referring now to FIG. 4, a method 400 of controlling power for a storage system, in accordance with an exemplary embodiment of the present disclosure, is shown. In step 401, determine that a data storage device is inactive, utilizing a controller communicably connected to the data storage device and a power connector, by detecting when the controller does not receive an input/output request for the data storage device within a time period. In step 402, direct the power connector, which is coupled to the data storage device and is operable to provide power to the data storage device and to cease providing power to the data storage device, utilizing the controller, to cease providing power to the data storage device when the controller determines that the data storage device is inactive. In step 403, cease providing power to the data storage device.

Figure 5:
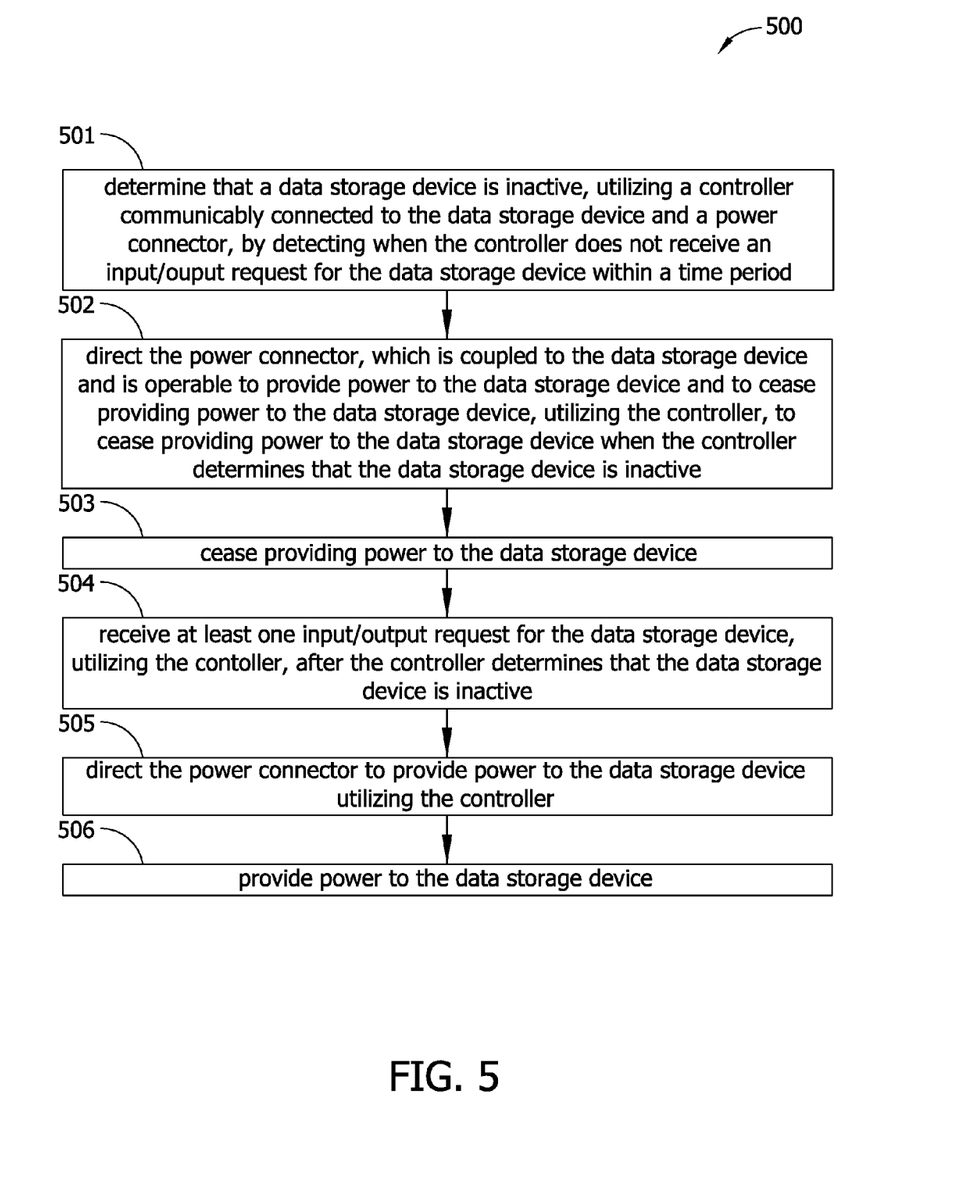
FIG. 5 is flow chart illustrating a method of controlling power for a storage system, in accordance with an alternative embodiment of the present disclosure.

Referring now to FIG. 5, a method 500 of controlling power for a storage system, in accordance with an alternative embodiment of the present disclosure, is shown. In step 501, determine that a data storage device is inactive, utilizing a controller communicably connected to the data storage device and a power connector, by detecting when the controller does not receive an input/output request for the data storage device within a time period. In step 502, direct the power connector, which is coupled to the data storage device and is operable to provide power to the data storage device and to cease providing power to the data storage device, utilizing the controller, to cease providing power to the data storage device when the controller determines that the data storage device is inactive. In step 503, cease providing power to the data storage device. In step 504, receive at least one input/output request for the data storage device, utilizing the controller, after the controller determines that the data storage device is inactive. In step 505, direct the power connector to provide power to the data storage device utilizing the controller. In step 506, provide power to the data storage device.

Figure 6:
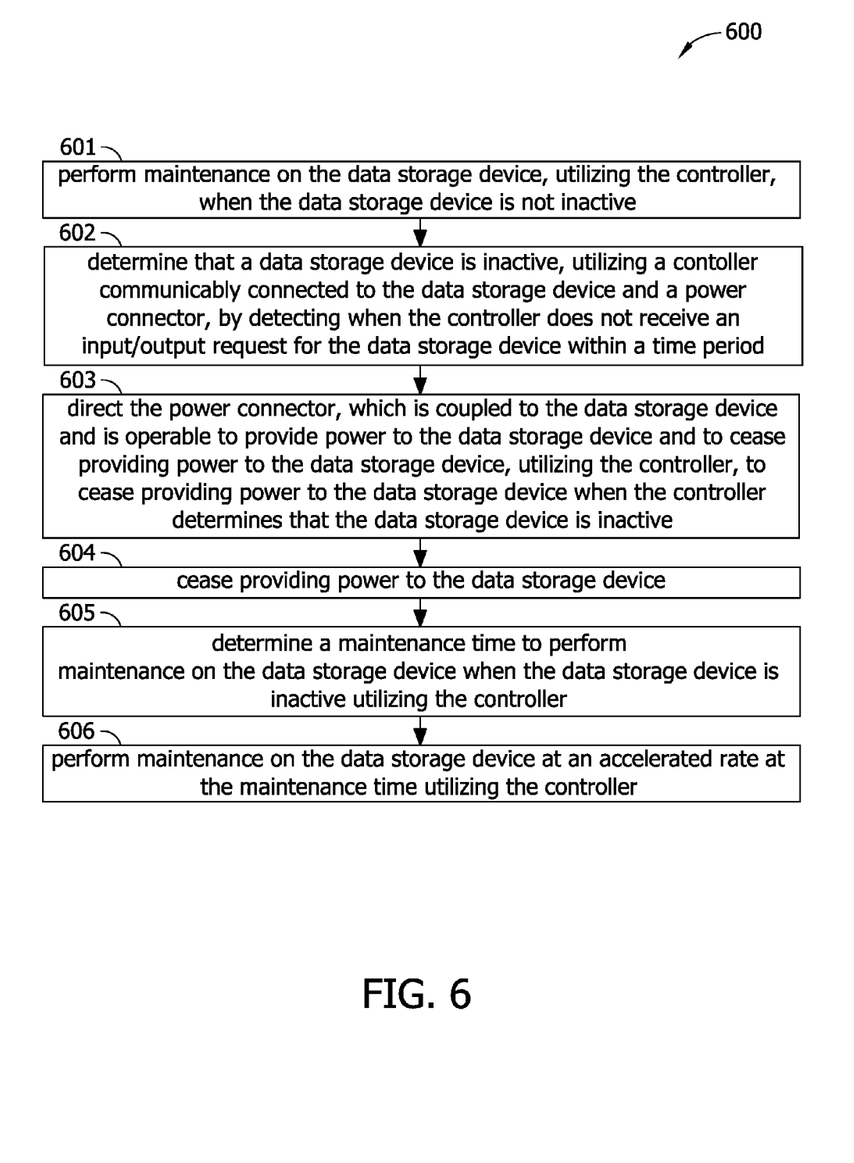
FIG. 6 is flow chart illustrating a method of controlling power for a storage system, in accordance with an alternative embodiment of the present disclosure.

Referring now to FIG. 6, a method 600 of controlling power for a storage system, in accordance with an alternative embodiment of the present disclosure, is shown. In step 601, perform maintenance on the data storage device, utilizing the controller, when the data storage device is not inactive. In step 602, determine that a data storage device is inactive, utilizing a controller communicably connected to the data storage device and a power connector, by detecting when the controller does not receive an input/output request for the data storage device within a time period. In step 603, direct the power connector, which is coupled to the data storage device and is operable to provide power to the data storage device and to cease providing power to the data storage device, utilizing the controller, to cease providing power to the data storage device when the controller determines that the data storage device is inactive. In step 604, cease providing power to the data storage device. In step 605, determine a maintenance time to perform maintenance on the data storage device when the data storage device is inactive utilizing the controller. In step 606, perform maintenance on the data storage device at an accelerated rate at the maintenance time utilizing the controller.

Figure 7:
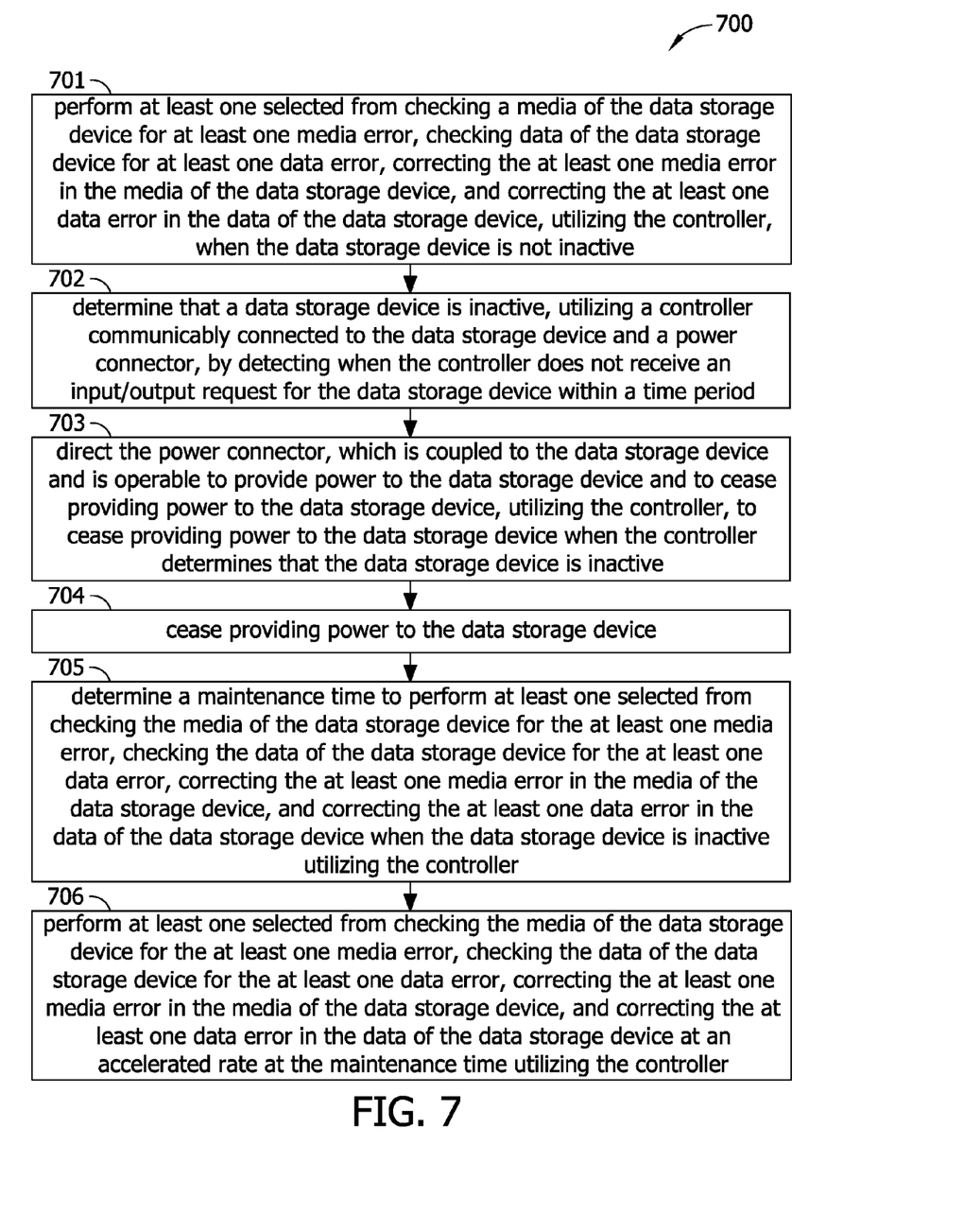
FIG. 7 is flow chart illustrating a method of controlling power for a storage system, in accordance with an alternative embodiment of the present disclosure.

Referring now to FIG. 7, a method 700 of controlling power for a storage system, in accordance with an alternative embodiment of the present disclosure, is shown. In step 701, perform at least one selected from checking a media of the data storage device for at least one media error, checking data of the data storage device for at least one data error, correcting the at least one media error in the media of the data storage device, and correcting the at least one data error in the data of the data storage device, utilizing the controller, when the data storage device is not inactive. In step 702, determine that a data storage device is inactive, utilizing a controller communicably connected to the data storage device and a power connector, by detecting when the controller does not receive an input/output request for the data storage device within a time period. In step 703, direct the power connector, which is coupled to the data storage device and is operable to provide power to the data storage device and to cease providing power to the data storage device, utilizing the controller, to cease providing power to the data storage device when the controller determines that the data storage device is inactive. In step 704, cease providing power to the data storage device. In step 705, determine a maintenance time to perform at least one selected from checking the media of the data storage device for the at least one media error, checking the data of the data storage device for the at least one data error, correcting the at least one media error in the media of the data storage device, and correcting the at least one data error in the data of the data storage device when the data storage device is inactive utilizing the controller. In step 706, perform at least one selected from checking the media of the data storage device for the at least one media error, checking the data of the data storage device for the at least one data error, correcting the at least one media error in the media of the data storage device, and correcting the at least one data error in the data of the data storage device at an accelerated rate at the maintenance time utilizing the controller.

Figure 8:
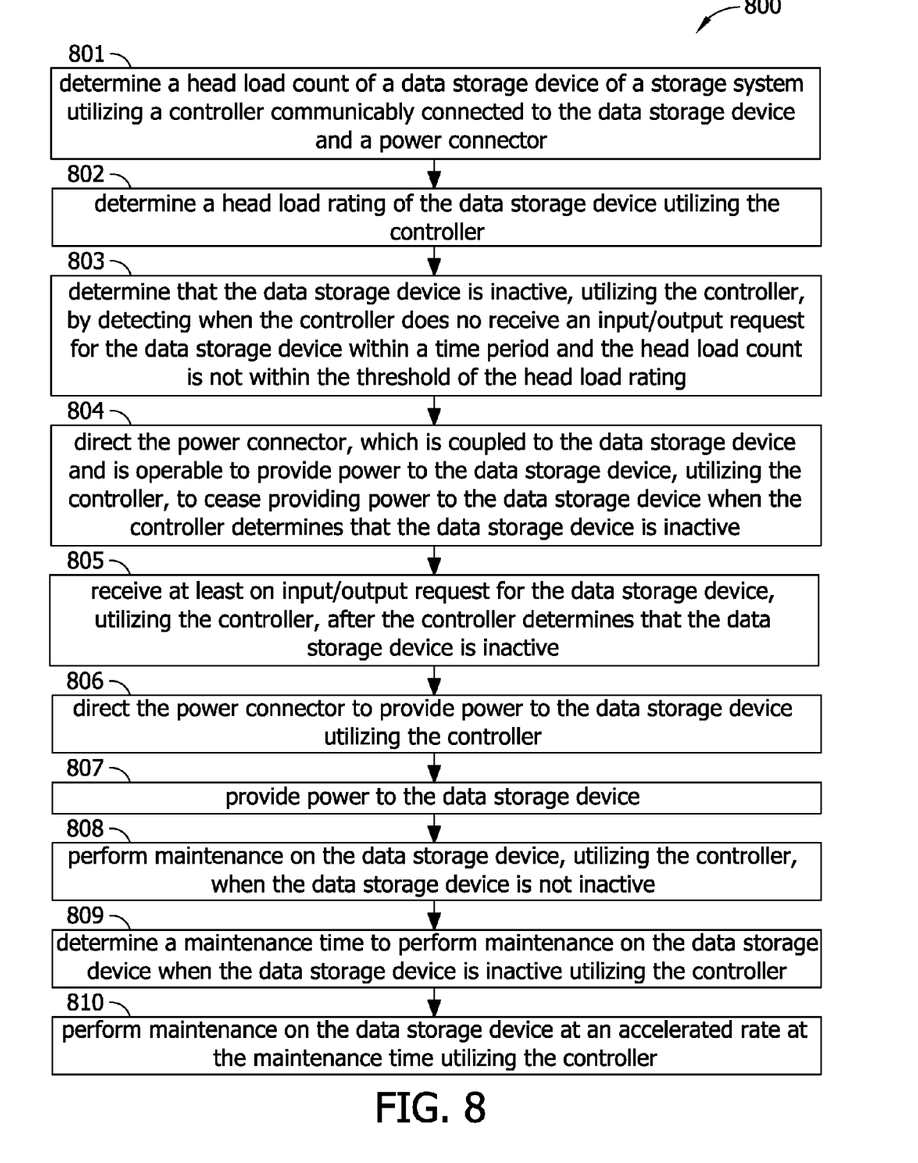
FIG. 8 is flow chart illustrating a method of controlling power for a storage system, in accordance with an alternative embodiment of the present disclosure.

Referring now to FIG. 8, a method 800 of controlling power for a storage system, in accordance with an alternative embodiment of the present disclosure, is shown. In step 801, determine a head load count of a data storage device of a storage system utilizing a controller communicably connected to the data storage device and a power connector. In step 802, determine a head load rating of the data storage device utilizing the controller. In step 803, determine that the data storage device is inactive, utilizing the controller, by detecting when the controller does not receive an input/output request for the data storage device within a time period and the head load count is not within the threshold of the head load rating. In step 804, direct the power connector, which is coupled to the data storage device and is operable to provide power to the data storage device, utilizing the controller, to cease providing power to the data storage device when the controller determines that the data storage device is inactive. In step 805, receive at least one input/output request for the data storage device, utilizing the controller, after the controller determines that the data storage device is inactive. In step 806, direct the power connector to provide power to the data storage device utilizing the controller. In step 807, provide power to the data storage device. In step 808, perform maintenance on the data storage device, utilizing the controller, when the data storage device is not inactive. In step 809, determine a maintenance time to perform maintenance on the data storage device when the data storage device is inactive utilizing the controller. In step 810, perform maintenance on the data storage device at an accelerated rate at the maintenance time utilizing the controller.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of controlling power for a storage system, comprising the steps of:
   determining that a data storage device is inactive, utilizing a controller communicably connected to the data storage device and a power connector, by detecting when the controller does not receive an input/output request for the data storage device within a time period;
   directing the power connector, which is coupled to the data storage device and is operable to provide power to the data storage device and to cease providing power to the data storage device, utilizing the controller, to cease providing power to the data storage device when the controller determines that the data storage device is inactive; and
   ceasing providing power to the data storage device,
   wherein the determining that a data storage device is inactive, utilizing a controller communicably connected to the data storage device and a power connector, by detecting when the controller does not receive an input/output request for the data storage device within a time period step further comprises:
      determining a head load count of the data storage device utilizing the controller;
      determining a head load rating of the data storage device utilizing the controller;
      determining whether the head load count is within a threshold of the head load rating utilizing the controller; and
      determining that the data storage device is inactive, utilizing the controller, when the controller has not received an input/output request for the data storage device within a time period and the head load count is not within the threshold of the head load rating.

2. The method of claim 1, further comprising the steps of:
   receiving at least one input/output request for the data storage device, utilizing the controller, after the controller determines that the data storage device is inactive; and
   directing the power connector to provide power to the data storage device utilizing the controller; and
   providing power to the data storage device.

3. The method of claim 2, wherein the receiving at least one input/output request for the data storage device, utilizing the controller, after the controller determines that the data storage device is inactive step further comprises:
   notifying an originator of the input/output request received for the data storage device, utilizing the controller, that the data storage device is unavailable and to retry the input/output request after a fixed period of time.

4. The method of claim 1, wherein the step of determining a head load count of the data storage device utilizing the controller further comprises:
   receiving the head load count from the data storage device utilizing the controller.

5. The method of claim 1, wherein the step of determining a head load rating of the data storage device utilizing the controller further comprises:

looking up the head load rating of the data storage device in a head load rating lookup table utilizing the controller.

6. The method of claim 1, further comprising:
performing maintenance on the data storage device, utilizing the controller, when the data storage device is not inactive;
determining a maintenance time to perform maintenance on the data storage device when the data storage device is inactive utilizing the controller; and
performing maintenance on the data storage device at an accelerated rate at the maintenance time utilizing the controller.

7. The method of claim 1, further comprising:
performing at least one selected from checking a media of the data storage device for at least one media error, checking data of the data storage device for at least one data error, correcting the at least one media error in the media of the data storage device, and correcting the at least one data error in the data of the data storage device, utilizing the controller, when the data storage device is not inactive;
determining a maintenance time to perform at least one selected from checking the media of the data storage device for the at least one media error, checking the data of the data storage device for the at least one data error, correcting the at least one media error in the media of the data storage device, and correcting the at least one data error in the data of the data storage device when the data storage device is inactive utilizing the controller; and
performing at least one selected from checking the media of the data storage device for the at least one media error, checking the data of the data storage device for the at least one data error, correcting the at least one media error in the media of the data storage device, and correcting the at least one data error in the data of the data storage device at an accelerated rate at the maintenance time utilizing the controller.

8. A storage system, comprising:
at least one data storage device;
a power connector, coupled to the at least one data storage device, which is operable to switch between a first state wherein the power connector provides power to the at least one data storage device and a second state wherein the power connector does not provide power to the at least one data storage device; and
a controller, communicably connected to the at least one data storage device and the power connector, which is operable to receive input/output requests for the at least one data storage device, provide the received input/output requests to the at least one data storage device, and to direct the power connector to switch between the first state and the second state;
wherein the controller determines that the at least one data storage device is inactive when the controller does not receive an input/output request for the at least one data storage device within a period of time and directs the power connector to switch to the second state when the controller determines that the at least one data storage device is inactive; and
wherein the controller determines a head load count of the at least one data storage device, the controller determines a head load rating of the at least one data storage device, and the controller determines that the at least one data storage device is inactive when the controller does not receive an input/output request for the at least one data storage device within the period of time and the head load count is not within a threshold of the head load rating.

9. The storage system of claim 8, wherein the controller receives an input/output request for the at least one data storage device, after the controller determines that the at least one data storage device is inactive, and directs the power connector to switch to the first state.

10. The storage system of claim 9, wherein in response to receiving the input/output request for the at least one data storage device, after the controller determines that the at least one data storage device is inactive, the controller notifies an originator of the input/output request for the at least one data storage device that the at least one data storage device is unavailable and to retry the input/output request after a fixed period of time.

11. The storage system of claim 8, wherein the period of time is approximately one hour.

12. The storage system of claim 8, wherein the at least one data storage device comprises one selected from a hard disk drive, a solid state drive, an IDE (integrated drive electronics) hard disk drive, an IDE solid state drive, an ATA (advanced technology attachment) hard disk drive, an ATA solid state drive, a PATA (parallel ATA) hard disk drive, a PATA solid state drive, a SATA (serial ATA) hard disk drive, a SATA solid state drive, a SCSI (small computer system interface) hard disk drive, a SCSI solid state drive, a SAS (serial attached SCSI) hard disk drive, a SAS solid state drive, a FC (fibre channel) hard disk drive, and a FC solid state drive.

13. The storage system of claim 8, wherein the head load rating is fifty thousand and the threshold is one thousand.

14. The storage system of claim 8, wherein the controller determines the head load count based on information provided by the at least one data storage device to the controller.

15. The storage system of claim 14, wherein the information provided by the at least one data storage device to the controller is SMART (self-monitoring, analysis, and reporting technology) information.

16. The storage system of claim 8, wherein the controller determines the head load rating based on information provided by the at least one data storage device to the controller.

17. The storage system of claim 8, wherein the controller determines the head load rating of the at least one data storage device by looking up the head load rating of the at least one storage device in a head load rating lookup table.

18. The storage system of claim 8, wherein the controller performs maintenance on the at least one data storage device when the at least one data storage device is not inactive, the controller determines a maintenance time to perform maintenance on the at least one data storage device when the at least one data storage device is inactive, and the controller performs maintenance on the at least one data storage device at an accelerated rate at the maintenance time.

19. The storage system of claim 18, wherein the at least one data storage device includes a media and data and maintenance comprises at least one selected from checking the media of the at least one data storage device for a media error, checking the data of the at least one data storage device for a data error, correcting at least one media error in the media of the at least one data storage device, and correcting at least one data error in the data of the at least one data storage device.

20. A method, comprising:
determining a head load count of a data storage device of a storage system utilizing a controller communicably connected to the data storage device and a power connector;
determining a head load rating of the data storage device utilizing the controller;

determining that the data storage device is inactive, utilizing the controller, by detecting when the controller does not receive an input/output request for the data storage device within a time period and the head load count is not within the threshold of the head load rating;

directing the power connector, which is coupled to the data storage device and is operable to provide power to the data storage device, utilizing the controller, to cease providing power to the data storage device when the controller determines that the data storage device is inactive;

receiving at least one input/output request for the data storage device, utilizing the controller, after the controller determines that the data storage device is inactive;

directing the power connector to provide power to the data storage device utilizing the controller;

providing power to the data storage device;

performing maintenance on the data storage device, utilizing the controller, when the data storage device is not inactive;

determining a maintenance time to perform maintenance on the data storage device when the data storage device is inactive utilizing the controller; and performing maintenance on the data storage device at an accelerated rate at the maintenance time utilizing the controller.

\* \* \* \* \*